May 15, 1956 — W. G. H. SCHMIDT — 2,745,379
AUTOMATIC EGG COLLECTOR FOR POULTRY HOUSES
Filed Feb. 5, 1952 — 2 Sheets-Sheet 1
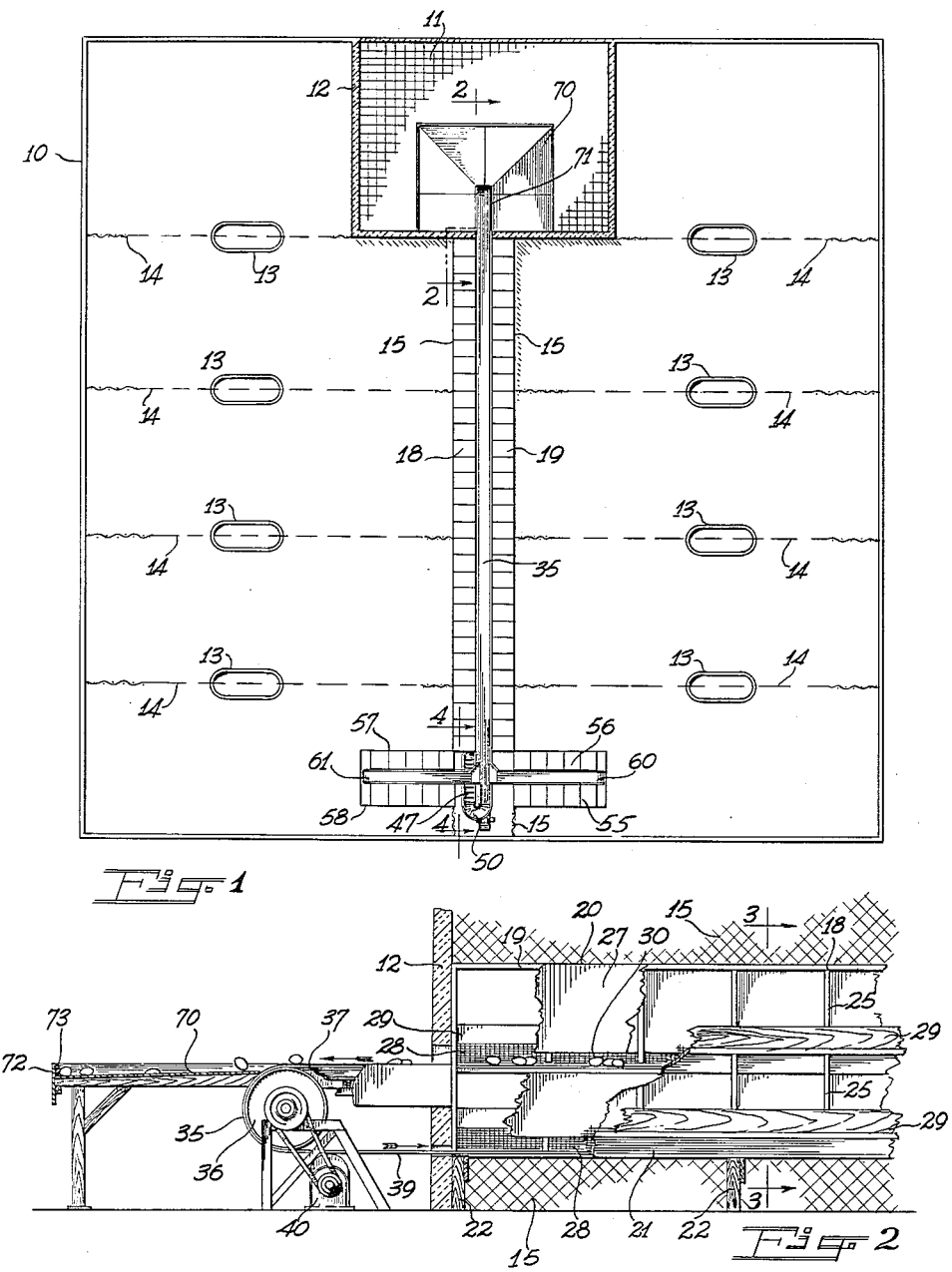
Walter G. H. Schmidt
INVENTOR.
BY Buckhorn and Cheatham
ATTORNEYS

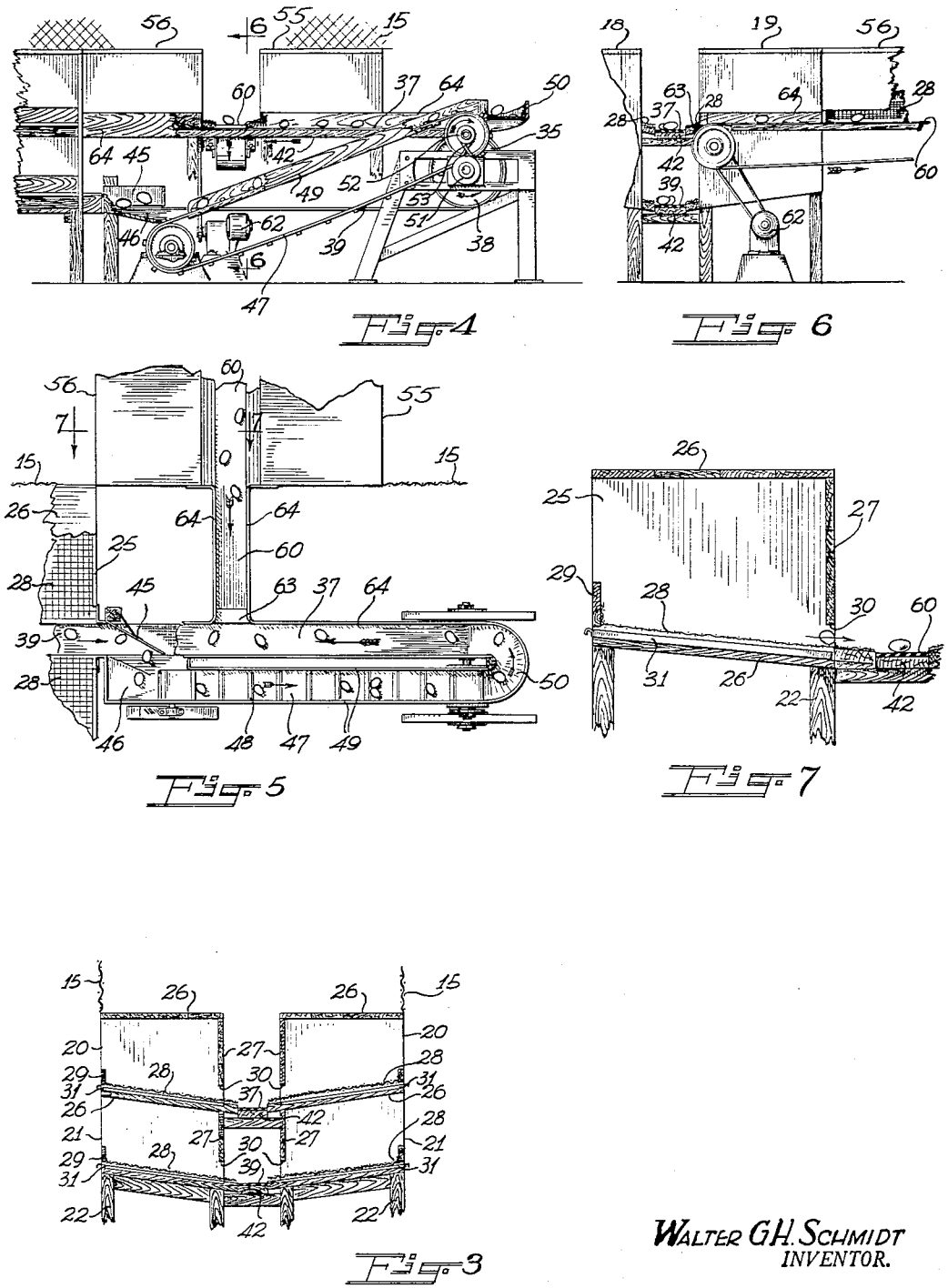

United States Patent Office 2,745,379
Patented May 15, 1956

2,745,379

AUTOMATIC EGG COLLECTOR FOR POULTRY HOUSES

Walter G. H. Schmidt, Hubbard, Oreg.

Application February 5, 1952, Serial No. 269,951

2 Claims. (Cl. 119—48)

The present invention relates to a husbandry system for poultry and more particularly to an arrangement for automatically collecting eggs from a battery of laying nests.

Like other mass production enterprises, poultry farming has been put on a mechanical basis and many mechanical means have been devised and are used in the operation of the poultry farm. In spite of the many advances which have been made, the egg collecting operation has heretofore been primarily a manual operation. It is a principal object of the present invention, therefore, to provide a new and improved apparatus for automatically collecting the eggs from a battery of nests and transporting them to a central location.

A further object of the invention is to provide a new and improved conveyor arrangement in an egg collection apparatus.

A still further object is to provide a new and improved egg collecting conveyor means for use with a plurality of superposed rows of nests.

In accordance with the illustrated embodiment of the present invention I have provided a poultry house having a refrigerated chamber or room adjacent thereto with a horizontally disposed conveyor means adapted to travel from the house to the refrigerated chamber. Arranged adjacent the conveyor means in the poultry house are a plurality of nests, each being provided with an inclined bottom and arranged whereby an egg laid in a nest will immediately roll gently from the bottom thereof onto the conveyor and be transported thereby into the refrigerated chamber. Means are provided in the chamber for receiving the eggs from the conveyor as they arrive therein.

Other objects and advantages of the present invention will be more readily ascertained from an inspection of the following specification taken in connection with the accompanying drawings wherein like numerals refer to like parts throughout, while the features of novelty will be more distinctly pointed out in the appended claims.

In the drawings,

Fig. 1 is a schematic plan view of a poultry house having my invention incorporated therein;

Fig. 2 is an enlarged side elevation taken along line 2—2 of Fig. 1 showing the discharge end of the conveyor and the egg receiving means with the nests adjacent thereto being broken away to show details of the construction and arrangement thereof;

Fig. 3 is a cross-sectional view taken along line 3—3 of Fig. 2;

Fig. 4 is an enlarged view taken along line 4—4 of Fig. 1 showing certain details of the invention;

Fig. 5 is a top plan view generally of the apparatus of Fig. 4;

Fig. 6 is a side elevation taken along line 6—6 of Fig. 4; and

Fig. 7 is an enlarged cross-sectional view taken along line 7—7 of Fig. 6 and showing the details of construction of the laying nest.

Referring now to Fig. 1, a poultry house 10 is shown having a refrigerated chamber 11 formed in one end thereof by the insulated walls 12. In accordance with the customary practice, the poultry house 10 is preferably divided into compartments in which may be segregated gorups of chickens, the compartments being formed by the transverse partitions 14 and the longitudinal partitions 15. The partitions may be of any suitable material, such as, for example, ordinary chicken wire. The poultry house may be provided with the usual feed and watering devices represented by the trays 13 and with mechanical devices (not shown) for supplying the same.

Extending longitudinally of the poultry house 10 are a first battery 18 and a second battery 19 of nests each comprising a longitudinal upper tier or row of nests 20 superposed on a lower horizontal tier or row of nests 21, supported on legs 22, as more particularly shown in Figs. 2 and 3. The nests are each formed with a pair of side walls 25, a top wall 26, a back wall 27 and a bottom 28 which slants downwardly toward the rear of the nest and which preferably extends a short distance beyond the back wall 27. The front of the nest is preferably enclosed at the lower portion thereof by a front wall 29 and may be completely enclosed with wire mesh or other suitable means if it is desired to keep the chickens confined within the nests. The lower edge of back wall 27 is spaced a distance above the bottom 28 to provide an opening 30 extending across the lower portion thereof of sufficient height whereby an egg laid in a nest may roll down the sloping bottom and out of the nest. The bottom 28 is preferably formed of a mesh material, such as, for example, one-half inch mesh screen so that any droppings from the hen may pass therethrough and be collected in a removable tray 31 provided beneath the bottom of the nest in which litter such as sawdust may be spread. As may be seen from Figs. 2 and 3, the longitudinal partitions 15 are secured to the upper front edges of the nests, and also extend between the lower front edges of the lower tier of nests and the floor.

The nests of batteries 18 and 19 are arranged in a spaced-apart, back-to-back relation, the bottoms of the nests in a given row lying in approximately the same plane with the rearward edges of the nest bottoms terminating in a substantially straight line, the rearward ends of the bottoms of the nests of the corresponding tiers terminating in substantially the same horizontal planes.

Eggs are collected as they roll from the nests by a horizontal conveyor means arranged closely adjacent the rearward edge of the nest bottoms. As shown, a conveyor belt 35 is arranged between the nest batteries 18 and 19 with the upper run 37 thereof lying substantially in the plane between the rearward ends of the nest bottoms of the upper tiers 20 and the lower run 39 similarly arranged between the lower tiers 21. The belt is supported at its opposite ends by the driving pulley 36 located within the refrigerated chamber 11 and the idler pulley 38 located at the far end of the nest batteries 18, 19, and is supported throughout its horizontal stretches by suitable support means, for example, the board 42. The conveyor belt 35 is driven by a suitable motor 40 so that the upper run 37 is moved continuously toward the refrigerated chamber and the lower run 39 is moved away therefrom.

Eggs collected on the lower run 39 of the belt are removed therefrom at the end opposite the room 11 and transferred to the upper belt run for conveyance to the delivery room by the cooperatively arranged transferring means most clearly illustrated in Figs. 4 and 5. As the eggs carried on the lower run 39 approach the idler pulley 38 they are intercepted by a deflecting plate 45 positioned diagonally across the run which causes the eggs to move on to a slightly declined platform 46 on which they roll to the upwardly moving upper reach of an elevating conveyor 47 provided with lugs 48 to engage the eggs and carry them upwardly. To prevent eggs from rolling off the sides of the elevating conveyor 47, the upper reach thereof is provided with longitudinally extending side members 49. The eggs are discharged at the upper end of the elevating conveyor 47 onto a gently declined chute 50 on which they roll to the upper run 37 of the conveyor belt 35. The elevating conveyor 47 may be conveniently driven from the idler pulley 38 by driving pulleys 51, 52 and belt 53 cooperatively arranged therewith.

The system of the invention is readily adapted to the incorporation of additional batteries of nests and which may, for example, be arranged at right angles to the direction of the batteries 18 and 19. This may be necessitated in certain layouts to provide adequate nesting space in certain compartments such as the end compartments shown at the bottom in the view of Fig. 1 in which the main batteries 18 and 19 are required to be foreshortened by reason of the space requirements of the elevator mechanism. Referring particularly to Figs. 4, 5 and 6, a first pair of rows of nests 55, 56 is arranged at right angles to the main batteries of nests 18, 19, with a second pair of rows of nests 57, 58 being arranged at right angles to the main batteries on the opposite side thereof. The nests of these lateral rows are of identical construction to those previously described, the rearward edges of the bottoms terminating in a plane slightly above that of the nest bottoms of the upper tiers 20 of batteries 18 and 19. A conveyor member which may be an endless belt 60 as shown, supported in the conventional manner, is arranged between the rows 55, 56 and a conveyor member or endless belt 61 is arranged between the rows 57, 58 to receive the eggs from the respective nests and carry them to the upper run 37 of conveyor belt 35. Only the arrangement of conveyor belt 60 is shown in detail in the drawings, the arrangement of conveyor belt 61 being substantially identical thereto. The conveyor belt 60 is driven by a suitable motor 62 so that the upper run thereof moves toward the upper run of conveyor belt 35. A slightly declined shelf 63 is arranged between the conveyor belt 60 and the upper run 37 of conveyor belt 35 to provide means for transferring the eggs from conveyor belt 60 to the upper run 37 on which they are conveyed to the refrigerated chamber. Vertical side wall members 64 may be provided adjacent opposite sides of each of the lateral conveyors and the runs of the conveyor 35 as well to prevent eggs from rolling off the sides thereof at those points where the conveyors extend beyond the nests.

Egg receiving means are cooperatively arranged at the delivery end of the conveyor belt 35. Immediately within the chamber 11 is an egg receiving table 70, the upper surface of which has a longitudinal slot 71 adapted to receive cooperatively the upper run of conveyor belt 35. The edges of the table defining the slot 71 are just slightly below the plane of the upper run 37 of conveyor belt 35, the table surface being slanted slightly downwardly therefrom to the sides and front of the table so that eggs may roll gently from the belt toward the upstanding edge 72 of the table which is preferably padded with a resilient material 73 such as sponge rubber to prevent eggs from breaking as they roll thereagainst. To more quickly chill the eggs, the table may be formed of a perforated material such as wire screen to permit circulation of cooling air past the eggs. Periodically, of course, the eggs are removed by hand from the table and packed for storage or shipment.

Though the present invention has been described in its applicability to batteries of nests comprising one or two tiers and a single pair of laterally extending batteries, it is obvious that the invention is applicable to multiple tier structures and to multiple laterally extending batteries of nests. Having illustrated and described a particular embodiment of my invention, it should be apparent to those skilled in the art that the invention permits of modification in arrangement and detail. I claim as my invention all such modifications as come within the true spirit and scope of the appended claims.

I claim:

1. An egg collecting arrangement for a poultry house comprising an endless conveyor member having upper and lower, horizontal runs, a plurality of laying nests arranged adjacent each of said runs, each of said nests including a bottom inclined downwardly toward the run adjacent which the nest is positioned and terminating immediately adjacent the upper surface of such run whereby eggs may roll from the nest onto the conveyor run adjacent thereto, a table adjacent one end of said upper run for receiving eggs from said upper run, drive means operatively connected to said conveyor member for driving the same with said upper run moving toward the table, and transfer means operatively arranged at the end of said conveyor member opposite said table for transferring eggs from said lower to said upper run, said transfer means comprising an elevating conveyor having a lower end adjacent said lower run and an upper end slightly above the level of said upper run, a deflecting plate positioned diagonally across said lower run to deflect eggs carried on the run onto said lower end of said elevating conveyor, and chute means extending between said upper end of said elevating conveyor and said upper run and inclined downwardly from said elevating conveyor for transferring eggs from said elevating conveyor onto said upper run.

2. An egg collecting arrangement for a poultry house comprising an endless horizontal conveyor having an upper and a lower run, a plurality of laying nests positioned adjacent each of said runs, each of said nests having a bottom wall inclined downwardly toward the run adjacent which the nest is positioned and terminating immediately adjacent the upper surface of such run, whereby an egg may roll smoothly from a nest onto the corresponding conveyor run, said upper and lower runs being vertically spaced apart a distance substantially equal to the height of said nests, transfer means operatively arranged at one end of said lower run for transferring eggs collected on said lower run to said upper run, and drive means operatively connected to said conveyor for driving the same with said lower run moving toward said one end thereof, and receiving means at the end of said upper run opposite said one end for receiving eggs carried on said upper run.

References Cited in the file of this patent

UNITED STATES PATENTS

| | | |
|---|---|---|
| 746,247 | Baggaley | Dec. 8, 1903 |
| 2,264,156 | Apple | Nov. 25, 1941 |
| 2,279,147 | Stimson | Apr. 7, 1942 |
| 2,294,025 | Dagg | Aug. 25, 1942 |
| 2,512,861 | Hill | June 27, 1950 |
| 2,536,621 | Arnold | Jan. 2, 1951 |
| 2,589,228 | Cordis | Mar. 18, 1952 |
| 2,597,064 | Charles et al. | May 20, 1952 |